United States Patent
Jones (10) Patent No.: US 10,362,095 B2
(45) Date of Patent: Jul. 23, 2019

(54) DISTRIBUTED NETWORK DIAGNOSTICS OF ENTERPRISE DEVICES UTILIZING DEVICE MANAGEMENT

(71) Applicant: AirWatch, LLC, Atlanta, GA (US)

(72) Inventor: Kevin Jones, Atlanta, GA (US)

(73) Assignee: Airwatch LLC, Atlanta, GA (US)

( * ) Notice: Subject to any disclaimer, the term of this patent is extended or adjusted under 35 U.S.C. 154(b) by 266 days.

(21) Appl. No.: 15/344,306

(22) Filed: Nov. 4, 2016

(65) Prior Publication Data
US 2018/0131751 A1 May 10, 2018

(51) Int. Cl.
*H04L 29/08* (2006.01)
*H04L 29/06* (2006.01)
*H04W 84/12* (2009.01)

(52) U.S. Cl.
CPC .......... *H04L 67/10* (2013.01); *H04L 67/2833* (2013.01); *H04L 67/34* (2013.01); *H04L 67/42* (2013.01); *H04W 84/12* (2013.01)

(58) Field of Classification Search
CPC ..... H04L 67/10; H04L 67/2833; H04L 67/34; H04L 67/42; H04W 84/12
See application file for complete search history.

(56) References Cited

U.S. PATENT DOCUMENTS

| | | | | |
|---|---|---|---|---|
| 2002/0103772 A1* | 8/2002 | Chattopadhyay | ...... | G06Q 10/10 705/412 |
| 2004/0153823 A1* | 8/2004 | Ansari | ................ | G06F 11/0715 714/38.14 |
| 2010/0162036 A1* | 6/2010 | Linden | .................. | G06F 11/181 714/4.11 |
| 2014/0004790 A1* | 1/2014 | Rozmaryn | ......... | H04B 7/18515 455/9 |
| 2014/0203948 A1* | 7/2014 | Raskar | ....................... | H04L 1/00 340/870.02 |
| 2016/0072693 A1* | 3/2016 | Michaelis | ............... | H04L 43/50 709/203 |
| 2016/0135042 A1* | 5/2016 | Netto | .................... | H04W 12/04 380/270 |
| 2017/0364406 A1* | 12/2017 | Kumar | ................ | G06F 11/0793 |

FOREIGN PATENT DOCUMENTS

WO    WO-2013119253 A2 *  8/2013  ......... H04L 43/0882

* cited by examiner

*Primary Examiner* — Brian J. Gillis
*Assistant Examiner* — Javier O Guzman
(74) *Attorney, Agent, or Firm* — Thomas | Horstemeyer, LLP (57) ABSTRACT

In response to receiving an indication from a client device experiencing a network connectivity error, a grouping of target client devices is identified for purposes of executing a distributed network diagnostic, the grouping being identified based on one or more configuration settings associated with client devices. The client devices in the identified grouping retrieve and execute an instruction. Data generated upon executing the instruction is received from each client device over a device management channel. The data is aggregated and trend data is generated. An instruction is sent to the client device experiencing the network connectivity error, wherein the instruction mitigates the network connectivity error.

20 Claims, 5 Drawing Sheets

DISTRIBUTED NETWORK DIAGNOSTICS OF ENTERPRISE DEVICES UTILIZING DEVICE MANAGEMENT

BACKGROUND

To reduce the cost of purchasing client devices and corresponding service charges, an enterprise may allow employees to utilize personal client devices under a "bring your own device" (BYOD) policy to access enterprise resources, such as electronic mail, contacts, calendar data, virtual private network (VPNs). Within the enterprise setting, client device administrators configure client devices to gain access to such resources, thereby allowing employees to remain highly productive regardless of whether the employees are on premises at the enterprise facility.

A client device will typically have multiple ways of accessing network services. For example, client devices can access network services using a wired interface (e.g., Ethernet) or using a wireless interface (e.g., Wi-Fi, Bluetooth, cellular). In some instances, however, transitioning from one network setting to another can cause loss of service on the client device. The user of the client device traditionally contacts an information technology (IT) administrator when such a network connectivity issue occurs, and the IT administrator then attempts to trouble-shoot the device based on the limited information that is available. As a result, it can be challenging for IT administrators to determine the root cause of a network connection failure on the client device. When multiple client devices experience failures, the trouble-shooting effort is compounded. As a result, the organization can incur overhead not only in time allocated for trouble-shooting the client device but also in lost productivity by the end users of the client device.

BRIEF DESCRIPTION OF THE DRAWINGS

Various aspects of the present disclosure can be better understood with reference to the following drawings. The components in the drawings are not necessarily to scale. Emphasis is placed upon clearly illustrating various features of the present disclosure. Moreover, in the drawings, like reference numerals designate corresponding parts throughout the several views.

DETAILED DESCRIPTION

Client device users in an enterprise environment may be granted access by IT administrators to electronic mail and other enterprise resources, thereby allowing users to work remotely. Directory services are often deployed in an enterprise computing environment to control who can access particular enterprise resources. However, client device users can sometimes experience service outages due to network connectivity issues. Today, a large number of support requests made to IT administrators are due to network related problems. Such network related issues are often difficult to diagnose as network connectivity and access can constantly change based on local network rules, firewalls, proxies, and additional network infrastructure components.

Trouble-shooting network related problems can be particularly challenging when supporting users whose client devices are configured to access cellular and/or Wi-Fi networks, as the client devices can frequently change networks. As a simple illustration, suppose that a user begins the day on the enterprise premises and utilizes the local area network (LAN) behind the enterprise firewall to access enterprise resources with a client device. Suppose that the user then leaves the enterprise premises for an offsite meeting and transitions to using a cellular connection or a public Wi-Fi network to access network resources. Different networks will have different networking rules in place, and simply analyzing and diagnosing a single client device can be difficult. Often times, the IT administrator does not have sufficient data to effectively trouble-shoot the networking issue.

While network diagnostics tools are available today that allow end users of client devices to manually test a network connection to a particular endpoint, these tools generally do not support cross-platform diagnostics. Such network diagnostic tools also do not offer a secure way for an IT administrator to send out a command in bulk to a grouping of client devices and receive a large sample size of diagnostic data. Executing diagnostics on a large scale would involve every end user having to download and install a particular network diagnostic tool/application, manually execute one or more diagnostics, and then manually sending the diagnostic data back to the IT administrator. Accomplishing this with a large volume of client devices would simply not be feasible.

The present disclosure relates to utilizing a device management channel to provide a secure, cross-platform diagnostic platform to a large number of client devices that may be running different operating systems while operating using different network configurations. The grouping of client devices selected to undergo diagnostics is not restricted to being on the same network. Such client devices executing diagnostic commands can be connected to a common network or to different networks. The present invention achieves a technical effect of providing IT administrators with a secure, distributed network diagnostics tool where an IT administrator is able to send a single command or diagnostic package to a fleet or grouping of client devices regardless of the client device platform and regardless of the local network settings of each client device.

The distributed network diagnostic platform allows the IT administrator to instruct each client device within a target grouping to connect to (or attempt to connect to) one or more specified endpoints and validate the network connection. Diagnostic information is then sent by the client devices back to the IT administrator through a secure device management channel to be aggregated and analyzed. Analysis of the aggregate set of data allows the IT administrator to quickly and efficiently determine if a particular network issue exists in a particular subset of client devices. If a root cause is not identified, the diagnostic application can be issued to the same or possibly different grouping of client devices to gather additional diagnostic information. On the other hand, if a root cause is identified, the diagnostic application can be issued to the same or possibly different grouping of client devices to verify the root cause. This iterative approach allows the IT administrator to determine what common client device settings or network attributes are causing the network connectivity issue. This is accomplished without requiring action by the end users. Furthermore, data is collected over a secure device management channel to ensure security, integrity, and privacy of the data and related persons.

Figure 1:
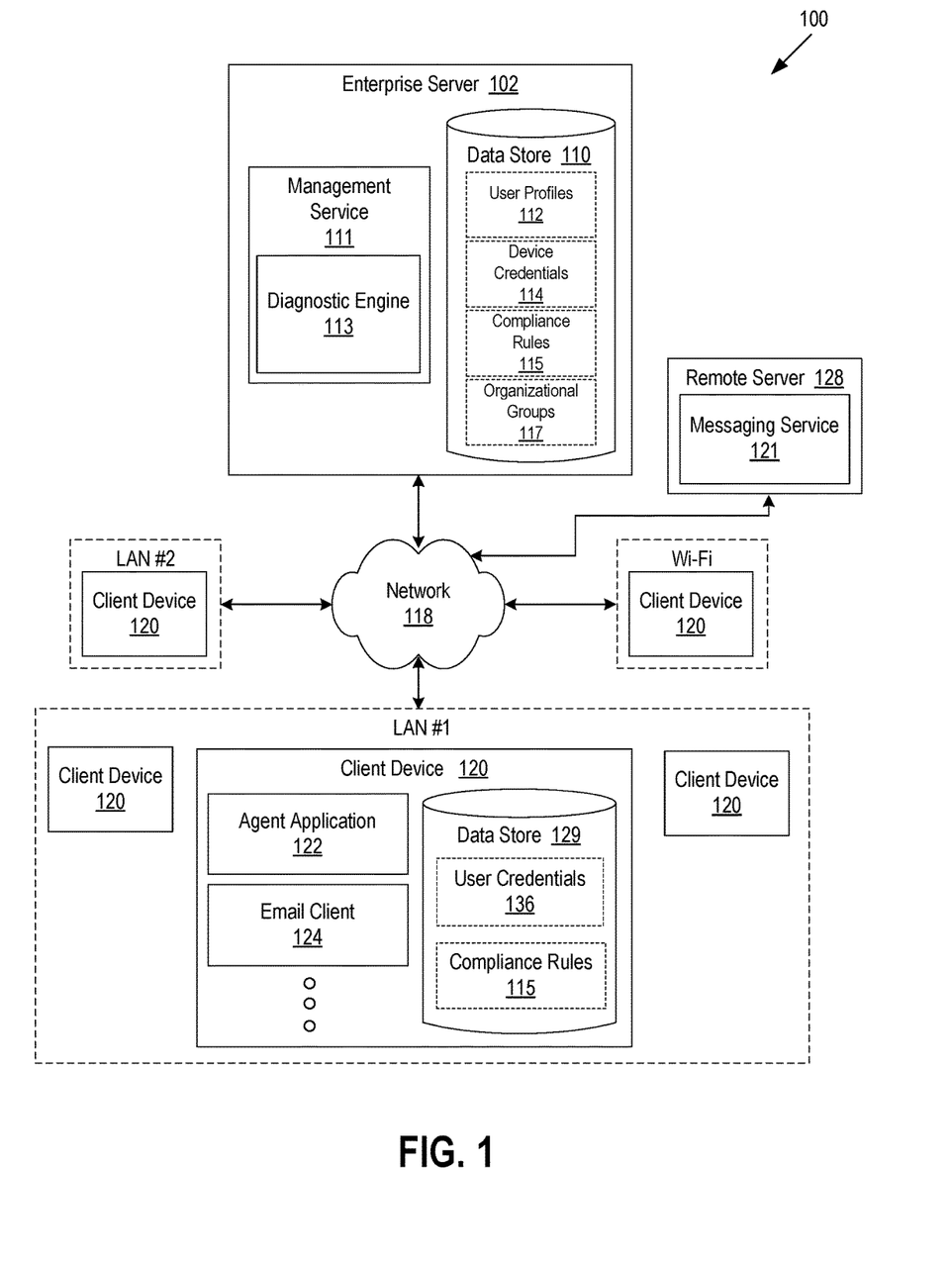
FIG. 1 is a block diagram of a networked environment for executing distributed network diagnostics in accordance with various embodiments.

A description of a system for implementing distributed network diagnostics is now described followed by a discussion of the operation of the components within the system. FIG. 1 depicts a networked environment 100 that includes an enterprise server 102, a client device 120, and a remote server 128, which can be communicatively coupled to one another over a network 118. The network 118 can include, for example, the Internet, one or more intranets, extranets, wide area networks (WANs), local area networks (LANs), wired networks, wireless networks, other suitable networks, or any combination of two or more such networks. For example, the networks can include satellite networks, cable networks, Ethernet networks, and other types of networks.

The enterprise server 102 can comprise, for example, a server computer or any other system providing computing capability. Alternatively, the enterprise server 102 can employ a plurality of computing devices that can be arranged, for example, in one or more server banks, computer banks or other arrangements. Such computing devices can be located in a single installation or can be distributed among different geographical locations. For example, the enterprise server 102 can include a plurality of computing devices that can collectively comprise a hosted computing resource, a grid computing resource and/or any other distributed computing arrangement. In some cases, the enterprise server 102 can correspond to an elastic computing resource where the allotted capacity of processing, network, storage, or other computing-related resources can vary over time. The enterprise server 102 can also include or correspond to one or more virtualized server instances that are created in order to execute the functionality that is described herein.

A management service 111 can be executed to monitor and manage the operation of client devices 120 in accordance with enterprise resource policies. In some instances, the management service 111 can manage and monitor the operation of client devices 120 enrolled with the management service 111. The management service 111 can also provide client devices 120 with access to email, calendar data, contact information, and other enterprise resources. The management service 111 can include an enrollment service that communicates with a client device 120 during the initial stages of enrollment with the management service 111.

The management service 111 can provide the client device 120 with a uniform resource locator (URL), IP address, or other information that can be used by the client device 120 to communicate with a specific instance of an enrollment service to initiate enrollment with a specific instance of a management service 111. That is, the networked environment 100 and/or enterprise server 102 can include a plurality of instances of an enrollment service and a plurality of instances of a management service 111 accessible through the networked environment, which can be accessed by the client device 120 through addresses specified by a particular URL, IP address, etc. The enrollment service can also provide the client device 120 with a token that indicates that the client device 120 has been authenticated and that the client device 120 is permitted to communicate with the management service 111. In some instances, the end user of the client device 120 can install an agent application 122 that causes the client device 120 to enroll with the management service 111, causes the client device 120 to be remotely configured and/or provisioned resources by the management service 111, causes the client device 120 to enforce security policies and compliance, causes the client device 120 to be provided with secure remote access to enterprise resources, and so on.

The management service 111 can be further configured to maintain a command queue of commands that are designated for execution by the client device 120, where each client device 120 has a corresponding command queue. A client device 120 can be provisioned by the enterprise server 102 by causing resources to be installed or stored on the client device 120 through the use of the command queue. To implement such a process, the enterprise server 102 places a command related to provisioning in the command queue. Regardless of whether a provisioning command or other command is stored in the command queue (e.g., command to execute a particular diagnostic test), the client device 120 can retrieve commands stored in its assigned command queue.

The diagnostic engine 113 can identify a grouping of target client devices 120 to leverage for performing distributed network diagnostics. This allows the IT administrator to troubleshoot a network connectivity issue being experienced by one or more client devices 120. The grouping identified by the diagnostic engine 113 can include one or more client devices 120 experiencing a network connectivity issue, as well as at least one client device 120 that is not experiencing a network connectivity issue. In such a scenario, the one or more client devices 120 that are not experiencing a network connectivity issue can serve as a control group, which can assist the diagnostic engine 113 in identifying a root cause of the network connectivity issue.

The diagnostic engine 113 can identify a grouping of client devices 120 to undergo diagnostics based on the type of network connection currently be utilized on each client device 120. As shown in FIG. 1, some client devices 120 can reside on the same LAN while other client devices 120 can reside on other networks such as a public Wi-Fi network. Yet other client devices 120 can be coupled to the network 118 using a cellular connection. Thus, as an example, if a client device 120 within a particular LAN (e.g., LAN #1 in FIG. 1) is experiencing network connectivity issues, the diagnostic engine 113 can identify a grouping that includes other client devices 120 currently coupled to the same LAN that are not experiencing network connectivity issues.

The enterprise server 102 can include a data store 110, where the data store 110 can be representative of a plurality of data stores. The data stored in the data store 110, for example, can be associated with the operation of the various applications and/or functional entities described below that are executed in the enterprise server 102. Various components can execute on a processor of the enterprise server 102 which can configure the processor to perform various operations.

Data stored in the data store 110 can include data describing the state of the client device 120 that specifies, for instance, various settings that are applied to the client device 120, applications that are installed on or that are being executed by the client device 120, the operating system and version installed on the client device 120, and resources (e.g., files, services) that are accessible to the client device 120. As described in more detail below, such data can be utilized for identifying a grouping of client devices 120. The grouping of target client devices 120 can then be leveraged for performing distributed network diagnostics.

Settings applied to the client device 120 can comprise values (e.g., IP address of an enterprise server 102) that enable functionality (e.g., turn on disk encryption) or disable functionality (e.g., require TLS/disable HTTP traffic). In this regard, such settings can comprise configurations or restrictions that control a plurality of operations that can be performed by the client device 120. Additionally, the data describing the state of the client device 120 can specify information related to the management of the client device 120 such as the last time the client device 120 provided its state information to the management service 111, whether the client device 120 is in a state of compliance with any applicable compliance rules 115, whether any actions have been or are to be taken as a result of a noncompliance with any applicable compliance rules 115, and so on.

Other data in the data store 110 of the enterprise server 102 can include user profile data 112, device credential data 114, compliance rules 115, organizational groups 117, and other data. The user profile data 112 can include data associated with a user account, such as mailbox data, calendar data, contact data, and so on. User profile data 112 can also include other account settings, such as biographical or demographic information about a user, password reset information, multi-factor authentication settings, and other data.

Device credential data 114 can include resource access settings for each specific client device 120. The device credential data 114 can include, for example, authentication credentials, delegation settings (e.g., information about other users who may be provided access to the user profile data 112 of a particular user), mail and document retention rules and/or policies, and/or other geographic access restrictions or limitations (e.g., information about certain locations and/or networks from which enterprise resources can be accessed).

Compliance rules 115 can include enterprise resource usage policies, which can be defined by an IT administrator. Client devices 120 seeking to access enterprise resources can, for instance, be required to comply with such compliance rules 115 in order to gain access to enterprise resources. That is, the operations, uses and/or configurations of the client device 120 must adhere to specifications and/or restrictions specified by the compliance rules 115. If the client device 120 violates one or more specifications of the compliance rules 115, escalating remedial actions can be performed to cause the client device 120 to be placed into compliance with the compliance rules 115. In one example, remedial actions can be initiated automatically when it is determined that the client device 120 is in violation of the compliance rules 115. In another example, remedial actions can be initiated at the request of an IT administrator. As the nature of the non-compliant activity increases in severity, the corresponding remedial action can escalate accordingly. Further, data describing management policies can include permissions or access rights of the client device 120 and settings that are being enforced upon the client device 120 for purposes of controlling if, when, and how the client device 120 is permitted to function.

For each client device 120, a device record is established and maintained by the management service 111, where the compliance rules 115 and management policies associated with an organizational group 117 are reflected in the device record for each member client device 120. The device record can specify organizational groups 117 (e.g., sales and marketing, legal) of which the client device 120 is a member. In some implementations, an administrator of the management service 111 can specify a static hard coded relationship between a client device 120 and an organizational group 117. That is, the client device 120 can be specified as a member of a particular organizational group 117 regardless of any context. Alternatively, the administrator of the management service 111 can specify a dynamic relationship that causes a membership condition associated with an organizational group 117 to be evaluated and, based on such evaluation, associates the client device 120 with a particular organizational group 117. That is, membership conditions can be monitored. Upon determining that a membership condition is not satisfied, the client device 120 can be excluded from the organizational group 117.

The management service 111 can associate the client device 120 with an organizational group 117 by storing data in a device record for the client device 120 indicating that the client device 120 is a member of a particular organizational group 117. In some instances, associating the client device 120 with an organizational group 117 can involve generating or modifying a data structure that represents associations between particular client devices 120 and a particular organizational group. For instance, the enterprise server 102 can generate a data structure representing an organizational group 117.

The client device 120 can be embodied as a processor-based system such as a desktop computer, a laptop computer, a smartphone, a tablet computer system, and so on. The client device 120 includes a display that comprises, for example, one or more devices such as liquid crystal display (LCD) displays or other types of display devices. The client device 120 is equipped with networking capability or networking interfaces, including a localized networking or communication capability, thereby allowing the client device 120 to be communicatively coupled to the enterprise server 102 over the network 118.

The client device 120 executes various applications, such as an agent application 122, an email client 124, and other applications, services, or processes. The agent application 122 is in communication with various components on the enterprise server 102, including the management service 111, thereby providing visibility with respect to the operation status of the client device 120 and also facilitating the identification of groupings by the diagnostic engine 113 for distributed network diagnostics. As discussed above, client device 120 can be provisioned by the management service 111 by causing resources to be installed or stored on the client device 120 through the use of the command queue maintained by the management service 111. The management service 111 can therefore permit or deny various services to the client device 120.

The email client 124 is executed to gain access to such data as mailbox data, calendar data, contact data, and so on. Where compliance rules 115 are stored locally on the client device 120, the agent application 122 monitors activities associated with the email client 124, the browser, and other applications installed on the client device 120 to determine whether activities associated with the client device 120 comply with the compliance rules 115. Each client device 120 can include a data store 129 configured to only allow authorized users (e.g., an IT administrator) access to data stored within the data store 129. The data store 129 can also include user credentials 136 associated with the end user of the client device 120.

Once a client device 120 has been remotely provisioned and enrolled by the IT administrator, the activities of the client device 120 are tracked by the management service 111. Compliance rules 115 can also be stored on the client device 120, where an agent application 122 reports any violations of compliance rules 115 to the enterprise server 102. In this regard, compliance rules 115 can be stored in the data store 110 and/or on the client device 120 and represent requirements with which a user and/or a client device 120 must comply in order to access enterprise resources.

In one instance, a client device 120 can become a member of or become associated with an organizational group 117 when an administrator of the organizational group 117 specifies that the client device 120 should be a member through a static hard coding. In another instance, a client device 120 can become a member of an organizational group 117 when a membership condition is satisfied through a dynamic evaluation of the membership condition. A membership condition can be created by an administrator of the organizational group 117 by specifying a condition related to the client device 120 that when satisfied, causes the membership of the organizational group 117 to include the client device 120. Conversely, the membership condition can also specify a condition related to the client device 120 that, when not satisfied, causes the membership of the organizational group to exclude the client device 120.

Once a particular individual has been identified as a member of the organizational group 117, one or more client devices 120 that the particular individual has or is using can become members of the organizational group. In this way, by virtue of a particular individual being a member of an organizational group 117, all the client devices 120 operated by the particular individual become subject to the management policies and compliance rules 115 associated with the organizational group 117—thereby controlling if, when, and how such client devices 120 can be operated by the particular individual. For security reasons, the various groupings of client devices 120 identified by the diagnostic engine 113 for performing distributed network diagnostics are restricted to client devices 120 that belong to the same organizational group 117.

The remote server 128 is communicatively coupled to the enterprise server 102 and client devices 120 over the network 118. The remote server 128 can include a messaging service 121 (e.g., APPLE PUSH NOTIFICATION SERVICE) and/or an email service provided by a manufacturer or operating system provider of the client device 120. Through the use of such messaging services 121, the enterprise server 102 can send notification data to a fleet or grouping of client devices 120, as described in more detail below in connection with FIG. 4. In some embodiments, the diagnostic engine 113 executing on the enterprise server 102 can utilize the messaging service 121 to send instructions to a grouping of client devices 120 to cause the client devices 120 to retrieve and execute a diagnostic application.

Figure 2:
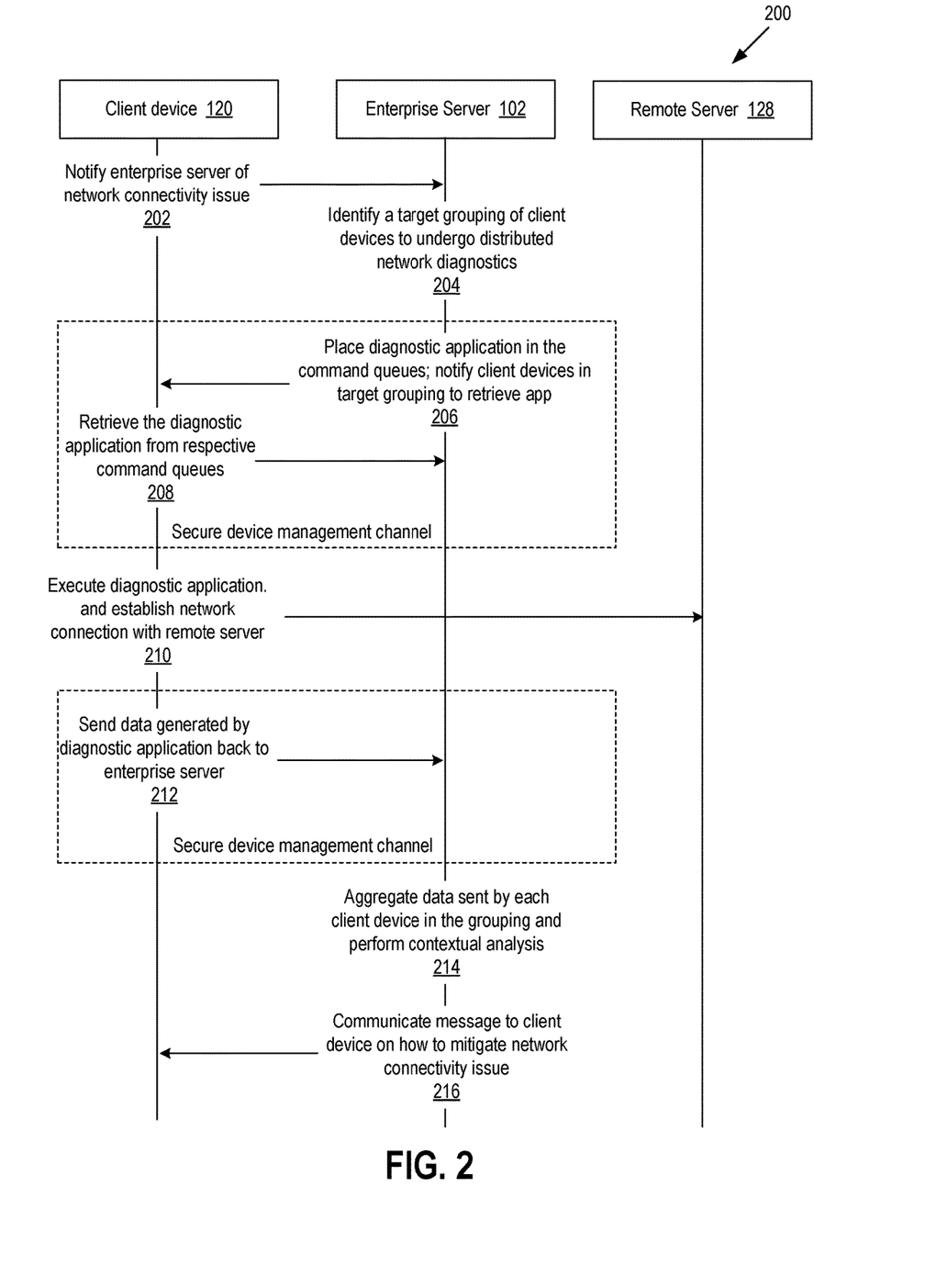
FIG. 2 is a sequence diagram that illustrates the interaction between various components in the networked environment of FIG. 1 in accordance with various embodiments.

Reference is now made to FIG. 2, which is a sequence diagram 200 that further illustrates the interaction between various components in the networked environment of FIG. 1 for performing distributed network diagnostics utilizing a device management framework.

Beginning at step 202, a client device 120 notifies the management service 111 in the enterprise server 102 of a network connectivity issue. In some instances, the agent application 122 executing on the client device 120 can automatically detect when a network connectivity issue has occurred. In such instances, the agent application 122 can automatically communicate the network connectivity issue to the management service 111, which can then invoke the diagnostic engine 113. The network connectivity issue can correspond to one or more layers of the networking framework, ranging from the physical layer to the application layer. To illustrate, one network connectivity issue can trigger an error message such as "failure to start network service." Another network connectivity issue can trigger an error message corresponding to a Secure Sockets Layer (SSL)/Transport Layer Security (TLS) error (e.g., certificate validation failure). Another network connectivity issue can trigger an error message corresponding to a Hypertext Transfer Protocol (HTTP) client error (e.g., 404 Not Found, 401 Unauthorized). In some instances, the client device 120 may not experience a total network outage. Rather, the client device 120 may experience issues accessing particular enterprise resources. Such network connectivity issues can be caused, for example, by an expired password. The type of network connectivity issue experienced by the client device 120 can facilitate the selection of what type of distributed diagnostic test to execute.

At step 204, the diagnostic engine 113 in the server can identify a grouping of target client devices 120 to leverage for performing distributed network diagnostics. As described in more detail below, the grouping of target client devices 120 can be identified based on one or more client device 120 attributes, configuration settings, network configuration settings, etc.

At step 206, the management service 111 can store a diagnostic application in the command queue for retrieval by each of the client devices 120 in the identified grouping. In other instances, the management service 111 can store an instruction in the command queue for retrieval by each of the client devices 120 in the identified grouping. The instruction can comprise a URL or IP address that points to a particular location (e.g., a repository of applications) where a diagnostic application (e.g., a diagnostic application) can be retrieved. The instruction can further comprise a command that instructs the client device 120 to download the diagnostic application and execute the application.

At step 208, each of the client devices 120 in the identified grouping can retrieve the diagnostic application from their respective command queues. In some instances, the client device 120 can establish a communication channel with the management server 111 on a pre-determined time interval (e.g., 4 hours). Upon establishing the communication channel, the client device 120 can retrieve any information/ payload that has been stored in its command queue. In other instances, the diagnostic engine 113 can notify the management service 111 that the diagnostic engine 113 wishes to have certain client devices 120 (e.g., client devices 120 in a grouping) retrieve an application to be executed. In such instances, the management service 111 can interface with the messaging service 121 to notify the client devices 120 in the grouping to check their corresponding command queues to retrieve the application placed in the command queues.

At step 210, each of the client devices 120 in the identified grouping executes the retrieved diagnostic application. The diagnostic application can be embodied as instructions or commands directing each client device 120 to execute a network connectivity application. The network connectivity application can cause, for example, a ping command to be executed by the client device 120. The ping command measures the round trip time for messages originating at each client device 120 to travel back from a target destination (e.g., remote server 128 in FIG. 1).

Note that the network connectivity application is not limited to a ping command and can comprise any network tool for establishing (or attempting to establish) a network connection with a specified endpoint. The network connectivity application can include a command and arguments/parameters associated with the command. In one example, the command can invoke a telnet command while the arguments/parameters can specify a particular network endpoint (e.g., mail.company.com) and port number (e.g., port 443). In some instances, the network connectivity utility can invoke a network tool that is already installed on the client device 120 (e.g., ping, telnet, netcat (nc)). In some instances, the network connectivity application can invoke a built-in component of the agent application 122 with its own network stack. In some instances, the network connectivity application can invoke calls to functions or routines native to an operating system executing on the client device 120. In some instances, the agent application 122 executing on the client device 120 can obtain the network connectivity application and translate the embedded command and associated arguments/parameters into a native format suitable for execution by the client device 120. As an alternative to executing a ping utility, the diagnostic application can direct each client device 120 to initiate a telnet session with the remote server 128.

At step 212, each client device 120 in the grouping sends data generated by execution of the diagnostic application back to the diagnostic engine 113 over the secure device management channel. The data sent by each client device 120 can comprise information reflecting whether an attempted network connection with a particular network access point (e.g., remote server 128) was unsuccessful. Note that steps 206, 208, and 212 are performed utilizing a secure device management channel.

At step 214, the diagnostic engine 113 aggregates all the data sent by each client device 120 in the grouping. The diagnostic engine 113 then performs contextual analysis to identify any trends or deviations with respect to client device 120 attributes, configuration settings, network settings, etc. among the client devices 120 in the grouping. For example, the diagnostic engine 113 can first identify client devices 120 that are experiencing a common network connectivity issues and then identity client devices 120 within that grouping that share common configuration settings (e.g., latest version of a particular operating system), status (e.g., compliant versus non-compliant), and so on. In this regard, the contextual analysis performed by the diagnostic engine 113 can be an iterative process, whereby additional data generated through the distributed diagnostics platform can be obtained as needed.

If a root cause is identified, then in step 216, the diagnostic engine 113 communicates a message or instruction to the client device(s) 120 experiencing the network connectivity issue, where the message or instruction mitigates the network connectivity issue. If a root cause is not identified, a different or expanded set of configuration settings is identified, and the process returns to step 204, where the diagnostic engine 113 identifies a new grouping of client devices 120 based on the updated configuration settings. Steps 206 to 214 are then repeated where the client devices 120 in the new grouping execute the diagnostics test. On the other hand, if a root cause is identified, another command can be issued to the same or possibly different grouping of client devices to verify that the root cause has been identified. For example, if a possible root cause is identified, the diagnostic engine 113 can cause the network configuration settings on the client device 120 to be modified. The diagnostic engine 113 can then cause the diagnostic command to be re-executed to determine whether the modified network configuration settings mitigate the network connectivity issue experienced by the client device 120. Note that in some instances, the root cause may correspond to a network endpoint (e.g., an email server) rather than to a client device 120. In such instances, the diagnostic engine 113 can take action with regards to the network endpoint (e.g., reboot the email server). The diagnostic engine 113 can then re-execute the diagnostic command to verify whether the network connectivity issue has been mitigated. In this regard, an iterative process involving steps 204 to 214 is leveraged to identify and/or verify a root cause of the network connectivity issue. The identification of updated groupings is performed in a hierarchical manner.

The iterative process can be applied by default, based on administrator configuration (defined prior to or upon initiating a particular diagnostic test), or based on administrator input. As an example where an administrator configuration is defined prior to initiating a diagnostic test, a compliance rule 115 could be defined that specifies that if a client device 120 cannot connect to a particular enterprise service, a particular diagnostic test is initiated using a particular grouping of client devices 120. The compliance rule 115 could be evaluated on the client side by the agent application 122, which could then message the management service 111 and instruct it to initiate the diagnostic test with the other client devices 120. As an alternative, the compliance rule 115 could be evaluated on the server side, and the agent application 122 could simply relay information of the network connectivity issue to the management service 111, which then evaluates the compliance rule 115 at the server side and the initiates the diagnostic test.

Administrator input can be entered through a user interface (UI) that indicates to the IT administrator that the root cause could not be identified. The UI can also indicate to the IT administrator that a root cause was identified. In this instance, the UI provides a user interface element that allows the IT administrator to specify whether the IT administrator wishes to verify the root cause. For example, activation/manipulation of the user interface element by the IT administrator causes the diagnostic test to be performed with a different grouping.

Figure 3:
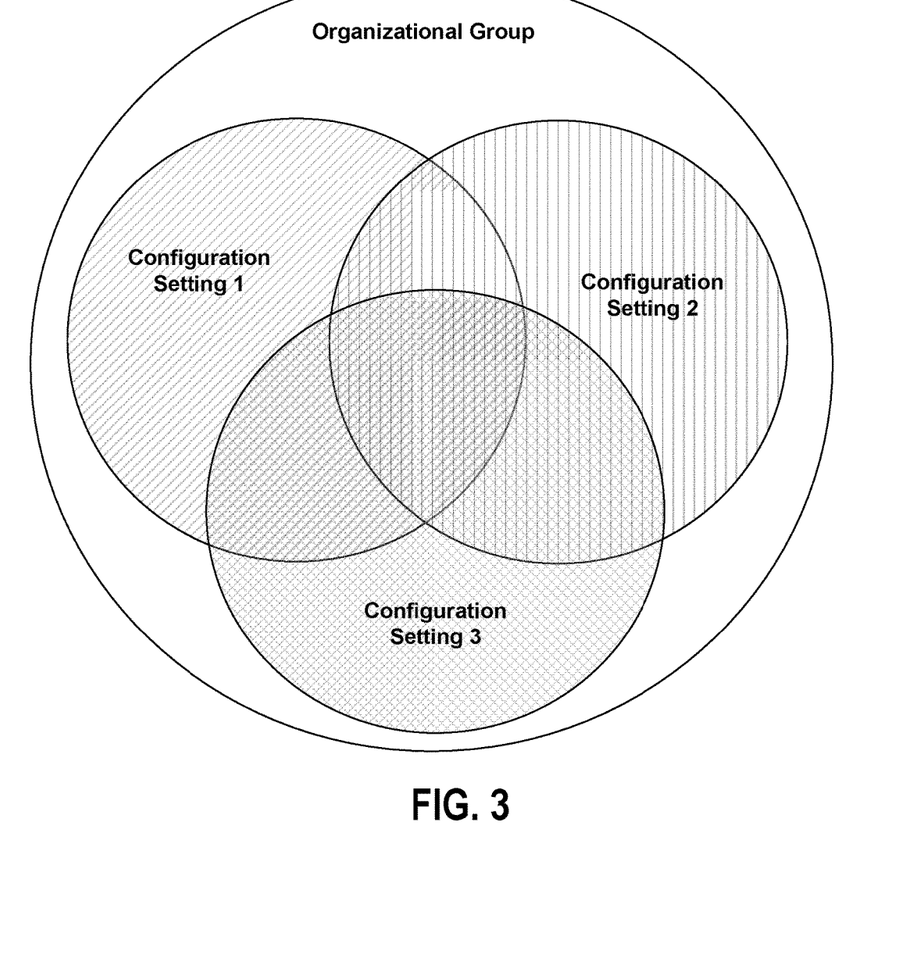
FIG. 3 illustrates an example of how a grouping of target client devices is identified by the diagnostic engine based on configuration settings in accordance with various embodiments.

FIG. 3 illustrates an example of how a grouping of target client devices 120 can be identified by the diagnostic engine 113 based on configuration settings. Configuration settings can refer to any number of attributes associated with a client device 120, including but not limited to, the device type (e.g., smartphone, laptop), the operating system and version installed on the client device 120, the current network configuration, the organizational group 117 (e.g., sales and marketing, legal) that the client device 120 is a member of, applications installed on the client device 120, and so on.

To illustrate, consider an example where the diagnostic engine 113 identifies a grouping based on client devices 120 that have four configuration settings. The first configuration setting can correspond to a specific device type (e.g., smartphones). The second configuration setting can correspond to the latest version of a particular operating system (e.g., latest version of ANDROID). The third configuration setting can correspond to a particular network connection status (e.g., public Wi-Fi). The fourth configuration setting can correspond to a particular geographical location (e.g., client devices 120 currently located in Atlanta, Ga.). Thus, in this example, smartphones in Atlanta running the latest version of ANDROID and currently coupled to a public Wi-Fi network are included in the grouping of client devices 120. As discussed earlier, for security reasons, the various groupings of client devices 120 identified by the diagnostic engine 113 are restricted to client devices 120 that belong to the same organizational group 117.

Upon receiving notification from a client device 120 of a networking connectivity issue, the diagnostic engine 113 analyzes configuration settings associated with the client device 120 and identifies a grouping of client devices 120 to leverage for performing distributed network diagnostics. For security purposes, the grouping of client devices 120 is limited to client devices 120 that are members of the same organizational group 117. In some instances, the diagnostic engine 113 can identify a grouping based on the intersection of multiple configuration settings, where client devices 120 that meet the specified criteria are included in the grouping. For example, a particular grouping can comprise client devices 120 that are running the latest version of a particular operating system, executing a particular email client application, and currently operating with a specific network configuration (e.g., public Wi-Fi).

Figure 4:
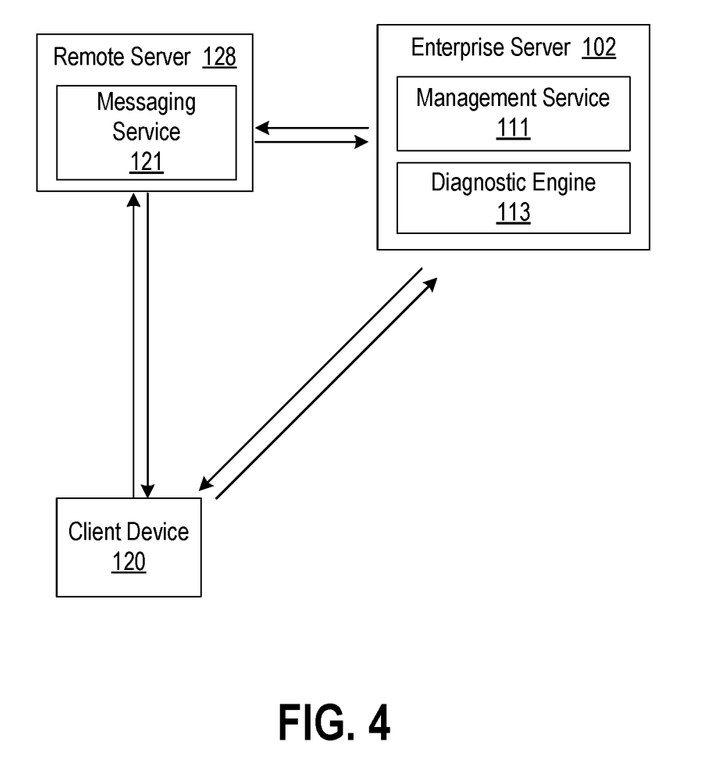
FIG. 4 is a block diagram providing additional details on how the notification service interface in the enterprise server operates in conjunction with a message notification service executing on the remote server in accordance with various embodiments.

FIG. 4 is a block diagram providing additional details on how the enterprise server 102 operates in conjunction with a messaging service 121 executing on the remote server 128 to facilitate communication between the enterprise server 102 and client devices 120. To begin, a client device 120 can establish an outbound connection to the messaging service 121 on a transmission control protocol (TCP) port (e.g., 5223, 443). The client device 120 can maintain a lightweight persistent connection to the messaging service 121 at all times, where the connection with the messaging service 121 can be reestablished whenever a client device 120 experiences a network state change (e.g., transition from one LAN to another).

To reestablish a connection with the messaging service 121, the client device 120 can be configured to send a "client hello" message or a request to establish a connection with the messaging service 121 on a variable frequency according to a proprietary algorithm implemented by a vendor of the messaging service 121. For example, a connection with the messaging service 121 can be reestablished upon a reboot of the client device 120 or upon regaining network access after a period of no network access. In response, the messaging service 121 can establish the lightweight persistent connection with the client device 120. The messaging service 121 can then send any messages that have not yet been sent to the client device 120. The management service 111 can establish a communication channel with the messaging service 121 executing on the remote server 128, and can instruct the messaging service 121 to transmit a particular message to a client device 120. The message can indicate a change or task. Specifically, the management service 111 can establish an outbound connection to the messaging service 121 on a TCP port (e.g., 2195). The messaging service 121 can communicate with the management service 111 over another TCP port (e.g., 2196).

The messaging service 121 can notify the client device 120 to communicate with the management service 111, where the client device 120 communicates directly with the management service 111 over a TCP port (e.g., 443). Once a direct connection is established between the client device 120 and the enterprise server 102, the management service 111 can instruct the client device 120 to retrieve updates, applications (e.g., diagnostic application), commands, etc. from the command queue associated with the client device 120. Where the IT administrator wishes to initiate a diagnostic test, the diagnostic engine 113 can identify a grouping of client devices 120. The management service 111 can then interface with the messaging service 121 to instruct the client devices 120 belonging to the identified grouping to retrieve a diagnostic application from their respective command queues.

Figure 5:
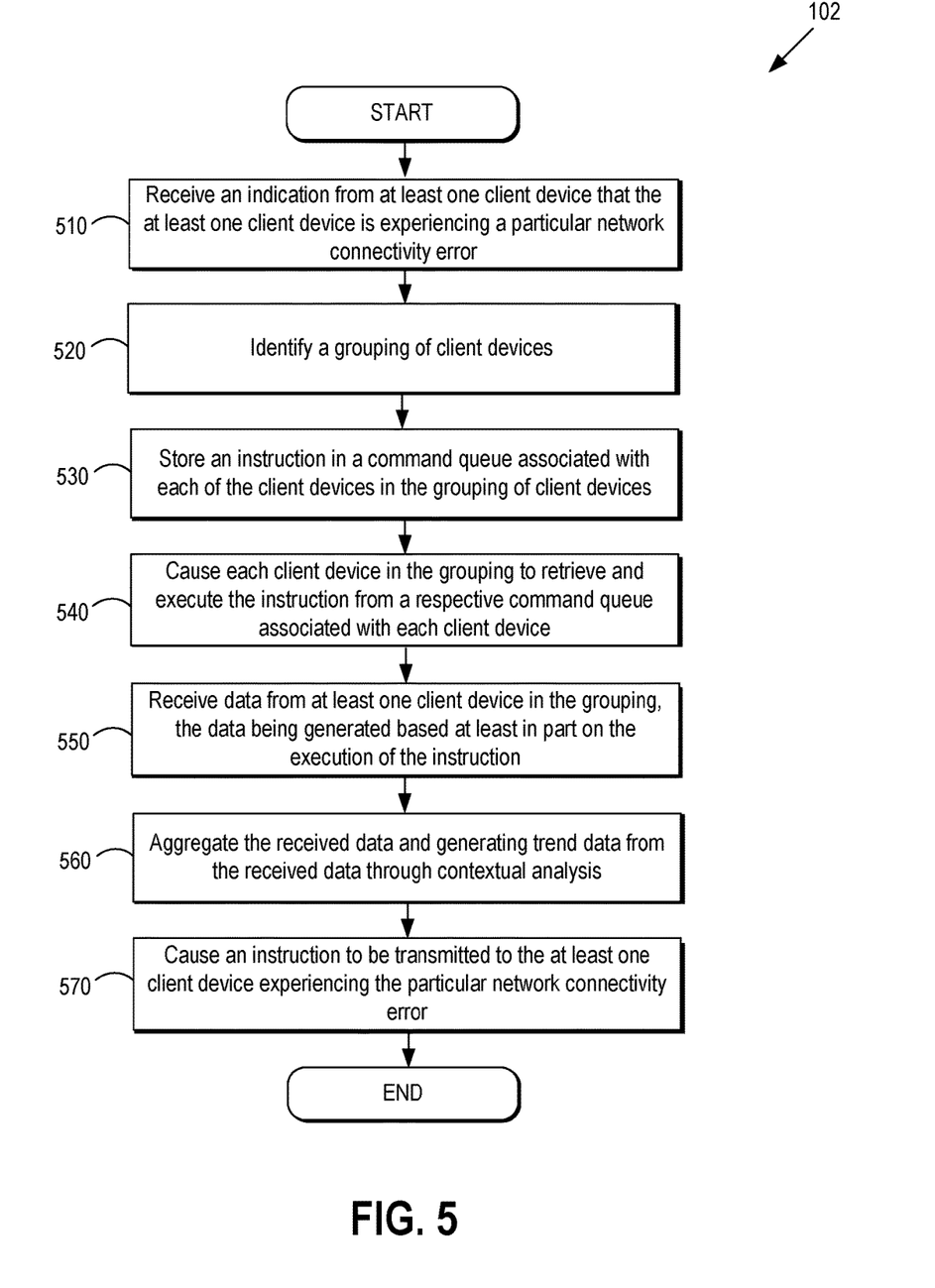
FIG. 5 is a flowchart that illustrates how the server performs distributed network diagnostics utilizing the device management framework in accordance with various embodiments.

Reference is made to FIG. 5, which is a flowchart that illustrates how the enterprise server 102 performs distributed network diagnostics utilizing the device management framework.

Beginning at step 510, the management service 111 executing in the enterprise server 102 can receive an indication from one or more client devices 120 that the client device 120 is experiencing a particular network connectivity error. For example, the network connectivity error can correspond to a service outage experienced by a client device 120. The service can comprise a messaging service 121, an email service, and so on.

At step 520, the diagnostic engine 113 can identify a grouping of client devices 120 to undergo a distributed network diagnostic. The grouping can include the client device 120 experiencing the particular network connectivity error and at least one client device 120 not experiencing the particular network connectivity error. As discussed earlier, the client devices 120 not experiencing the particular network connectivity error can function as a control group in helping to identify a root cause of the network connectivity error being experienced by another client device 120.

At step 530, the diagnostic engine 113 can initiate a diagnostic test by communicating with the management service 111, which then stores an instruction in a command queue associated with each of the client devices 120 in the grouping of client devices 120. The instruction can comprise a URL or IP address that points to a particular location (e.g., a repository of applications) where an application (e.g., a diagnostic application) can be retrieved. The instruction can further comprise a command that instructs the client device 120 to download the application and execute the application. In some instances, the client device 120 can establish a communication channel with the management server 111 on a pre-determined time interval (e.g., 4 hours). Upon establishing the communication channel, the client device 120 can retrieve any information/payload that has been stored in its command queue. In other instances, the diagnostic engine 113 can notify the management service 111 that the diagnostic engine 113 wishes to have certain client devices 120 (e.g., client devices 120 in a grouping) retrieve an application to be executed. In such instances, the management service 111 can interface with the messaging service 121 to notify the client devices 120 in the grouping to check their corresponding command queues to retrieve the application placed in the command queues.

At step 540, the diagnostic engine 113 can communicate with the management service 111, which then causes each client device in the grouping to retrieve and execute the instruction from a respective command queue associated with each client device 120. As discussed above, the instruction can comprise information (e.g., URL) specifying a location of an application. The instruction can further comprise a command instructing the client device 120 to download the application and execute the application. The application can comprise a diagnostic application utilized for helping to identify a root cause of the network connectivity error.

At step 550, the diagnostic engine 113 receives data from at least one client device 120 in the grouping, where the data was generated based at least in part on the execution of the instruction. The received data can comprise information reflecting whether an attempted network connection with a particular network access point (e.g., remote server 128) was unsuccessful. For example, the received data can comprise data relating to execution of a network utility (e.g., a ping command). In this instance, the received data can comprise the round-trip time or an error message indicating that execution of the command resulted in a time-out message being generated.

At step 560, the diagnostic engine 113 aggregates the received data and generates trend data from the received data through contextual analysis. For example, the diagnostic engine 113 can identify client devices 120 that are experiencing a common network connectivity issues and identity client devices 120 within that grouping that share common configuration settings (e.g., latest version of a particular operating system), status (e.g., compliant versus non-compliant), and so on. In this regard, the contextual analysis performed by the diagnostic engine 113 can be an iterative process, whereby additional data generated through the distributed diagnostics platform can be obtained as needed At step 570, the diagnostic engine 113 can communicate with the management service 111, which causes an instruction to be transmitted to the at least one client device 120 experiencing the particular network connectivity error. The instruction is based at least in part on the generated trend data. In some instances, the instruction can comprise a network configuration profile coupled with a command that instructs the client device 120 to install or incorporate the particular network configuration. As an example, the network configuration profile can specify a Service Set Identifier (SSID) and/or password required for accessing a particular Wi-Fi network, where the client device 120 is currently coupled to that particular Wi-Fi network. In this example, the command embedded in the instruction instructs the client device 120 to incorporate these network settings, thereby allowing the client device 120 to access that particular Wi-Fi network. Furthermore, in this example, the instruction transmitted to the client device 120 can mitigate the network connectivity error. The root cause of the network connectivity error can be misconfiguration of network settings on the client device 120 that prevent the client device 120 from accessing a network access point.

Other network connectivity errors can be caused by non-compliant activities by a client device 120. A remote server 128 providing a service (e.g., a messaging service 121) may require compliance with certain compliance rules before allowing client devices 120 to access the service. In some instances, such compliance rules associated with the remote server 128 may differ from compliance rules 115 associated with the management service 111. In such instances, the network connectivity error experienced by the client device 120 can be caused by denial of service by the remote server 128. Thus, an instruction transmitted to the client device 120 for mitigating the network connectivity error can comprise a notification to the user of the client device 120, where the notification alerts the user that the client device 120 is not compliant with compliance rules enforced by the remote server 128. The notification can further instruct the user how to bring the client device 120 back into compliance. For example, the notification can instruct the user to uninstall a particular application from the client device 120.

In other instances, the instruction can comprise a command that when executed, causes the particular application to be automatically uninstalled from the client device 120 without action by the user. In some instances, if the compliance rules enforced by the remote server 128 do not align with the compliance rules 115 associated with the management service 111, the diagnostic engine 113 can interface with the management service 111 to cause the compliance rules to align with one another. For example, if the compliance rules enforced by the remote server 128 prohibit the installation of a particular application (e.g., a gaming application), the compliance rules 115 associated with the management service 111 could be modified to similarly prohibit installation of that particular application. Further, the particular application, if installed on the client device 120, can be removed by causing a command to be executed on the client device 120 that causes the particular application to be uninstalled. Thereafter, the process shown in FIG. 5 ends.

Various example scenarios are now described to further illustrate features of the distributed diagnostics platform disclosed above in connection with FIG. 5. In a first scenario, the client device 120 notifies the diagnostic engine 113 that the client device 120 is unable to access email using the email client 124 while the email client is connected to a particular WiFi network (e.g., a public WiFi network). In response, the diagnostic engine 113 can obtain configuration settings of the client device 120. For example, the configuration settings obtained by the diagnostic engine 113 can include the Service Set Identifier (SSID) of the WiFi network that the client device 120 is currently connected to. The diagnostic engine 113 can also cause the client device 120 to execute an initial network connectivity test, whereby the client device 120 attempts to establish a network connection with a particular endpoint specified by the diagnostic engine 113. The diagnostic engine can then obtain log data based on the connection (or attempted connection) with the specified endpoint. Suppose in this example scenario that the log data includes an error message (e.g., "TSL/SSL Error occurred") that occurred when the client device 120 attempted to establish a connection with the specified endpoint.

In this particular scenario, a network connectivity issue can be due to a proxy configuration setting. In an attempt to narrow down the root cause of the network connectivity issue, the diagnostic engine 113 can then cause the client device 120 to disable the first network connection type (e.g., the WiFi connection) connection and attempt to connect to the same specified endpoint using a different network connection type (e.g., a cellular connection). If the client device 120 is then able to successfully connect to the specified endpoint, then the diagnostic engine 113 can determine that the root cause of the network connectivity issue likely corresponds to the first network connection type (e.g., WiFi connection), and the diagnostic test ends. However, if the network connectivity issue persists with the second network connection type, then the diagnostic engine 113 can generate a grouping of client devices 120 with similar configuration settings (e.g., client devices connected to the same SSID) for more comprehensive distributed diagnostic testing.

Within the identified grouping of client devices (e.g., client devices executing one of two particular operating systems), the diagnostic engine 113 can query the log data associated with the client devices 120 in order to determine which client devices 120 are experiencing the same network connectivity issue. In this instance, if the diagnostic engine 113 can identify a trend from the obtained log data whereby client devices 120 operating a first operating system are experiencing the network connectivity issue while client devices 120 operating a second operating system are not experiencing the network connectivity issue, then the diagnostic engine 113 can narrow the root cause to a configuration setting involving the first operating system.

An iterative approach can be applied by the diagnostic engine 113 to further narrow down the grouping of client devices 120 with common configuration settings. In this example where the root cause is associated with a particular operating system, the diagnostic engine 113 can cause the client devices 120 experiencing the network connectivity issue to upgrade to the latest version of the operating system in an attempt to mitigate the network connectivity issue. In another example where the network connectivity issue is observed across client devices 120 executing different operating systems (e.g., a cross-platform scenario), the diagnostic engine 113 can determine that the root cause may be associated with the particular endpoint (e.g., email server). In this example, the diagnostic engine 113 can then take action on the server side (e.g., initiate a reboot of the server), and the diagnostic test ends.

In a second scenario, the client device 120 notifies the diagnostic engine 113 that the client device 120 is unable to access an enterprise resource (e.g., a collaboration/document management website) that is only available to client devices 120 connected to the enterprise network behind the corporate firewall. In this example, the diagnostic engine 113 can cause the client device 120 experiencing the network connectivity issue to execute a ping command in an attempt to establish a network connection with the specified endpoint. In this example, assume that the specified endpoint corresponds to the collaboration/document management website. The log data generated by the ping command can then be obtained by the diagnostic engine 113. Assume in this example that the log data reflects that the client device 120 is able to successfully ping the specified endpoint. In this scenario, since the client device 120 is able to establish a network connection with the collaboration/document management website but is unable to access resources of the collaboration/document management website, the diagnostic engine 113 can provide the client device 113 with updated client credentials. If the client device 120 is able to access resources of the collaboration/document management website using the updated client credentials, a root cause has been identified and the diagnostic test ends.

With regards to the flowchart in FIG. 5, it should be emphasized that the functionality attributed to the various components can be implemented in a single process or application executed by the enterprise server 102 in multiple processes or applications. Furthermore, it should be emphasized that the separation or segmentation of functionality as discussed herein is presented for illustrative purposes only as various functions can be combined or performed concurrently.

The flowchart of FIG. 5 and the diagrams of FIGS. 2 and 3 show examples of the functionality and operation of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowchart and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The various components described herein can include at least one processing circuit, where such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the components described herein can be stored in one or more storage devices and be executable by one or more processors. Also, a data store, such as the data store 110 in the enterprise server 102 and the data store 129 in the client device 120 can be stored in the one or more storage devices.

The various components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

One or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

The invention claimed is:

1. A computer-implemented method for executing distributed network diagnostics on a grouping of client devices, the method comprising:
receiving an indication from at least one client device that the at least one client device is experiencing a particular network connectivity error;
identifying the grouping of client devices, the grouping including the at least one client device experiencing the particular network connectivity error and at least one client device not experiencing the particular network connectivity error;
storing an instruction in a command queue associated with each of the client devices in the grouping of client devices;
causing each client device in the grouping to retrieve and execute the instruction from a respective command queue associated with each client device, the instruction specifying a location for retrieving an application for checking a network status of the client device;
receiving data from at least one client device in the grouping, the data being generated based at least in part on the execution of the instruction;
aggregating the received data and generating trend data from the received data through contextual analysis; and
causing an instruction to be transmitted to the at least one client device experiencing the particular network connectivity error, the instruction being based at least in part on the generated trend data.

2. The method of claim 1, wherein execution of the instruction causes each client device to establish a network connection with at least one service.

3. The method of claim 2, wherein the at least one service comprises a messaging service or an electronic mail server.

4. The method of claim 1, wherein the grouping of client devices comprises a grouping of client devices associated with a same organizational group associated with a management service.

5. The method of claim 4, wherein the grouping of client devices comprises a grouping of client devices located within a particular geographic location.

6. The method of claim 4, wherein the grouping of client devices comprises a grouping of client devices associated with a plurality of operating systems.

7. The method of claim 1, wherein the data received from each client device in the grouping is received over a device management communication channel, and wherein the device management communication channel is encrypted.

8. The method of claim 1,
wherein the indication a change in network connectivity status of a client device in the grouping.

9. A system comprising:
at least one computing device; and
a diagnostic engine executed by the at least one computing device, the diagnostic engine causing the at least one computing device to at least:
receive an indication from at least one client device that the at least one client device is experiencing a particular network connectivity error;
identify a grouping of client devices, the grouping including the at least one client device experiencing the particular network connectivity error and at least one client device not experiencing the particular network connectivity error;
store an instruction in a command queue associated with each of the client devices in the grouping of client devices;
cause each client device in the grouping to retrieve and execute the instruction from a respective command queue associated with each client device, the instruction specifying a location for retrieving an application for checking a network status of the client device;
receive data from at least one client device in the grouping, the data being generated based at least in part on the execution of the instruction;
aggregate the received data and generating trend data from the received data through contextual analysis; and
cause an instruction to be transmitted to the at least one client device experiencing the particular network connectivity error, the instruction being based at least in part on the generated trend data.

10. The system of claim 9, wherein the grouping of client devices is further identified based at least in part on at least one device configuration setting.

11. The system of claim 10, wherein the at least one device configuration setting comprises a current network configuration.

12. The system of claim 9, wherein execution of the instruction causes each client device to establish a telnet session with at least one service to verify Internet Protocol (IP)-level connectivity with the at least one service.

13. The system of claim 9, wherein execution of the instruction causes each client device to execute a ping command to verify Internet Protocol (IP)-level connectivity with at least one service.

14. The system of claim 13, wherein the at least one service comprises a messaging service or an electronic mail server.

15. The system of claim 9, wherein the grouping of client devices comprises a grouping of client devices associated with a same organizational group associated with a management service.

16. The system of claim 15, wherein the grouping of client devices comprises a grouping of client devices located within a particular geographic location.

17. The system of claim 15, wherein the grouping of client devices comprises a grouping of client devices associated with a plurality of operating systems.

18. The system of claim 9, wherein the data received from each client device in the grouping is received over a device management communication channel, and wherein the device management communication channel is encrypted.

19. A non-transitory computer-readable medium storing a plurality of computer instructions executable by a computing device, wherein the plurality of computer instructions cause the computing device to at least:
receive an indication from at least one client device that the at least one client device is experiencing a particular network connectivity error;
identify a grouping of client devices, the grouping including the at least one client device experiencing the particular network connectivity error and at least one client device not experiencing the particular network connectivity error;
store an instruction in a command queue associated with each of the client devices in the grouping of client devices;
cause each client device in the grouping to retrieve and execute the instruction from a respective command queue associated with each client device, the instruction specifying a location for retrieving an application for checking a network status of the client device;

receive data from at least one client device in the grouping, the data being generated based at least in part on the execution of the instruction;

aggregate the received data and generating trend data from the received data through contextual analysis; and cause an instruction to be transmitted to the at least one client device experiencing the particular network connectivity error, the instruction being based at least in part on the generated trend data.

20. The non-transitory computer-readable medium of claim 19, wherein the data received from each client device in the grouping is received over a device management communication channel, and wherein the device management communication channel is encrypted.

* * * * *